US005785294A

United States Patent [19]

Schultz

[11] Patent Number: 5,785,294
[45] Date of Patent: *Jul. 28, 1998

[54] NECKING APPARATUS SUPPORT

[75] Inventor: Robert H. Schultz, Golden, Colo.

[73] Assignee: Coors Brewing Company, Golden, Colo.

[*] Notice: The term of this patent shall not extend beyond the expiration date of Pat. No. 5,553,826.

[21] Appl. No.: 686,209

[22] Filed: Jul. 23, 1996

Related U.S. Application Data

[63] Continuation of Ser. No. 438,894, May 10, 1995, Pat. No. 5,553,826.

[51] Int. Cl.[6] .................................................. F16M 1/00
[52] U.S. Cl. ........................ 248/678; 148/346.01; 108/64
[58] Field of Search .................. 248/678, 346.01, 248/346.07, 676; 108/50, 64, 180, 185, 153

[56] References Cited

U.S. PATENT DOCUMENTS

| 4,446,714 | 5/1984 | Clacho | 72/370 |
| 4,693,108 | 9/1987 | Traczyk | 72/370 |
| 5,553,826 | 9/1996 | Schultz | 248/678 |
| 5,611,231 | 3/1997 | Marritt et al. | 72/94 |

Primary Examiner—Ramon O. Ramirez
Assistant Examiner—Gwendolyn W. Baxter
Attorney, Agent, or Firm—Klaas, Law, O'Meara & Malkin, P.C.; Joseph J. Kelly

[57] ABSTRACT

Modular supports for supporting a plurality of necking-in stations and a plurality of transfer stations wherein each of the modular supports has a base that is releasably secured to an adjacent base, at least two spaced apart support columns; a first support plate supported on and secured to the at least two spaced apart columns for supporting a necking-in station and a second support plate secured to first support plate for supporting a transfer station.

31 Claims, 1 Drawing Sheet

5,785,294

NECKING APPARATUS SUPPORT

This application is a continuation of application Ser. No. 08/438,894 now Pat. No. 5,533,826 filed May 10, 1995, which is hereby incorporated by reference for all that is disclosed therein.

FIELD OF THE INVENTION

This invention relates generally to the necking-in of tubular members, such as can body members, and more specifically to modular supports for units of a necking-in apparatus.

BACKGROUND OF THE INVENTION

In the manufacture of tubular members, such as can body members, it is necessary to neck-in the open end portion of the tubular member. Also, the number of times a tubular member must be passed through a necking-in operation depends on the desired shape of the necked-in portion. Sometimes the desired shape can be obtained in one necking-in operation and other times the desired shape requires a plurality of necking-in operations. Therefore, it is desirable to provide necking-in apparatus that can be readily modified to provide for one or more necking operations. U.S. Pat. No. 4,446,714 provides necking-in apparatus in modular form so that the necking-in apparatus can be modified to provide for one or more necking-in operations. Such modular apparatus require a support that can readily be used to make the desired modifications.

BRIEF DESCRIPTION OF THE INVENTION

This invention provides a plurality of modular supports so that the number of necking-in stations for a necking-in apparatus can be readily changed.

In a preferred embodiment of the invention a plurality of modular supports are arranged in a side-by-side relationship wherein each of the plurality of modular supports comprises a hollow elongated longitudinally extending base, each having at least a top wall, opposite sidewalls and opposite channel shaped end walls. The opposite sidewalls are secured to the ends of the channel shaped end walls and have space apart opening adjacent each end thereof. The top wall is secured to the opposite sidewalls and to the channel shaped end member. Releasable securing means are provided for releasably securing together the adjacent sidewalls of adjacent bases. At least two spaced apart support columns are secured to and project from the top wall. A first elongated longitudinally extending support plate is supported on and secured to the at least two spaced apart support columns and is used to support at least one necking-in station. A second elongated longitudinally extending support plate for supporting at least one transfer station is supported on at least a portion of the first elongated longitudinally extending support plate and has a longitudinal extent substantially less than the longitudinal extent of the first elongated longitudinally extending support plate. Support means are provided and comprise at least two opposite sidewalls, two opposite end walls and a bottom wall secured to and projecting from the second elongated longitudinally extending support plate in a direction toward the hollow elongated longitudinally extending base. The opposite sidewalls have flange portions that extend past the opposite end walls and have openings therein so that the flange portions may be secured to at least one of the at least two spaced apart support columns by passing headed threaded bolts through the openings in the flange portions and securing them in threaded openings in the one support column. A damaged can deflector is also provided.

BRIEF DESCRIPTION OF THE DRAWINGS

An illustrative and presently preferred embodiment of the invention is shown in the accompanying drawing in which.

DETAILED DESCRIPTION OF THE INVENTION

Figure 1:
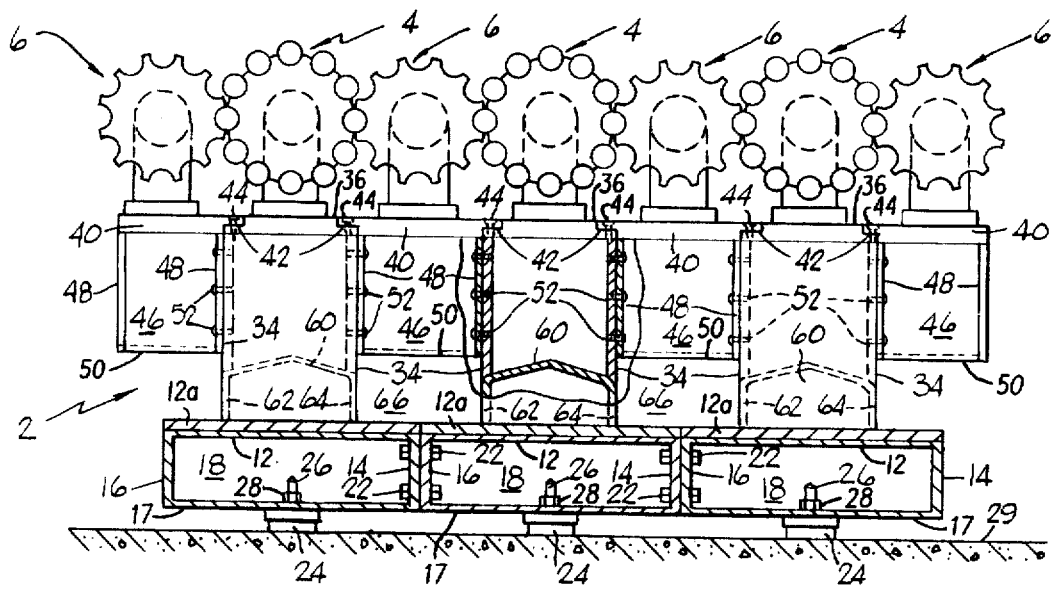
FIG. 1 is a front elevational view with parts in section and parts schematically illustrated.

In FIG. 1, there is illustrated a modular support 2 for supporting a plurality of necking-in stations 4 comprising conventional apparatus for providing a necked-in portion adjacent the open end of a can body and a plurality of transfer stations 6 comprising conventional transfer apparatus for receiving unnecked-in can bodies transferring the can bodies through the necking-in stations and feeding the necked-in can bodies to a conveyor (not shown).

Each modular support 2 has a hollow elongated longitudinally extending base 10 having a top wall 12, opposite sidewalls 14 and 16, bottom wall 17 and opposite channel shaped end walls 18. The opposite sidewalls 14 and 16 are secured to the opposite ends of the channel shaped end walls 18 by suitable means such as by welding. The top wall 12 includes a plate 12a mounted thereon with opposite end portions thereof superposed over the associated sidewalls 14 and 16. The top wall 12 is secured to the opposite sidewalls 14 and 16 and the channel shaped end walls 18 by suitable means, such as by welding. Each of the opposite sidewalls 14 and 16 have spaced apart openings 20 adjacent to the end portions thereof so that adjacent bases 10 may be joined together by nuts and bolts 22 passing through the openings 20. Each base 10 has two vibration absorbing pads 24 which are secured to the opposite channel spaced end walls 18 by a threaded projection 26 passing through openings in the lower leg of the channel shaped end walls 18 and secured thereto by threaded nuts 28 for supporting each base 10 on a fixed surface 29. The channel shaped end walls 18 are preferably made from a mild steel having a thickness of about 0.50 inch. The top wall 12 and the sidewalls 14 and 16 are preferably formed from a mild steel having a thickness of about 1.00 inch.

Figure 2:
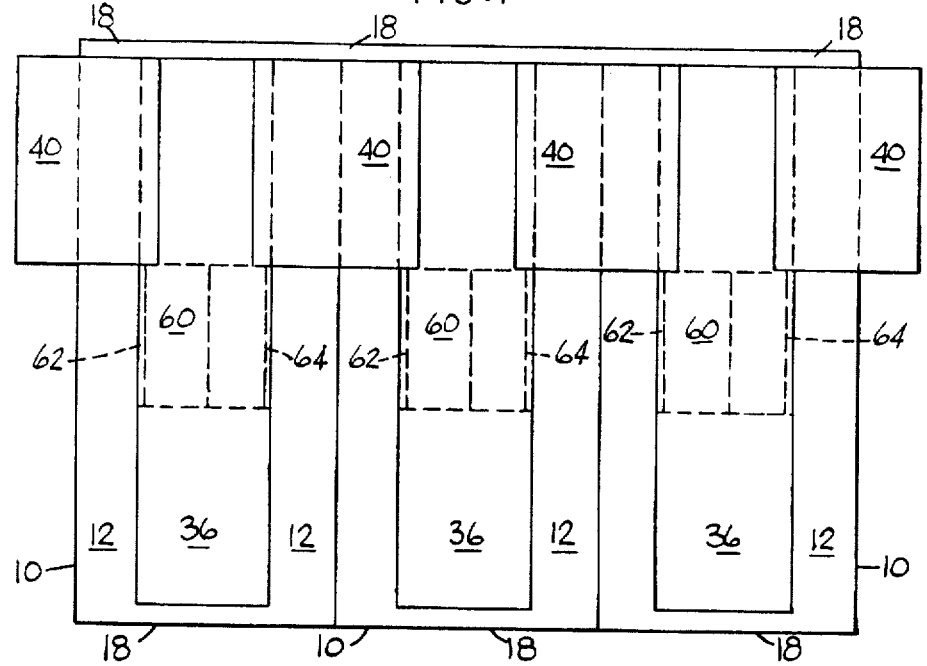
FIG. 2 is a top plan view of FIG. 1 with parts removed.
Figure 3:
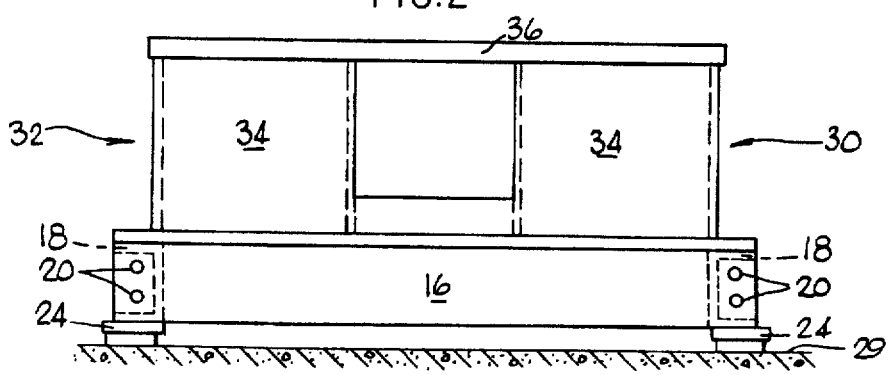
FIG. 3 is an end elevational view taken from the left side of FIG. 2.

A pair of spaced apart support columns 30 and 32 have four sidewalls 34 secured to each other in a right angular relationship by suitable means, such as by welding. The sidewalls 34 are preferably formed from a mild steel having a thickness of about 0.05 inch. Each of the support columns 30 and 32 project upwardly from the plate 12a and are secured thereto by suitable means, such as by welding. First elongated longitudinally extending support plates 36 are supported by the support columns 30 and 32 and are secured to them by suitable means, such as by welding. The necking-in stations 4 are mounted on the first elongated longitudinally extending support plates 36. As illustrated in FIGS. 2 and 3, the first elongated a longitudinally extending support plates 36 have longitudinal extent less than the longitudinal extent of the top walls 12.

Second elongated longitudinally extending support plates 40, having a longitudinal extent less than the longitudinal extent of the first elongated longitudinally extending support plates 36, are mounted on and secured to the first elongated longitudinally extending support plates 36 using a straight splice joint 42 and threaded bolts 44. Opposite end walls 46 and opposite sidewalls 48 are joined together in a right angle relationship by suitable means, such as by welding and to each of the second elongated longitudinally extending supports 40 by suitable means, such as by welding. A bottom wall 50 is secured to the end walls 46 and sidewalls 48 by suitable means, such as by welding. Each of the sidewalls 48 have flange portions projecting outwardly pass the end walls 46 so that the sidewalls 48 can be secured to the sidewalls 34 by suitable means, such a threaded bolts 52 passing through openings in the flange portions and threaded into threaded openings in the sidewalls 34. The first and second elongated longitudinally extending support plates are preferably formed from a mild steel having a thickness of about 1.50 inches.

A damaged can body deflector having a angle shaped top wall 60 and opposite sidewalls 62 and 64 is secured to facing sidewalls 34 by suitable means, such as by welding to deflect damaged can bodies falling from the transfer stations 6 into the space 66.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed:

1. A method of supporting at least one necking-in station and at least one transfer station on a modular support, comprising the steps of:

providing a hollow elongated longitudinally extending base having at least a top wall, opposite sidewalls and opposite end walls;

securing at least two spaced apart support columns to said top wall;

supporting a first elongated longitudinally extending support plate having a longitudinal extent on said at least two spaced apart support columns;

supporting at least one necking-in station on said first elongated longitudinally extending support plate;

providing a second elongated longitudinally extending support plate having a longitudinal extent substantially less than the longitudinal extent of said first elongated longitudinally extending support plate;

supporting said second elongated longitudinally extending support plate on at least a portion of said first elongated longitudinally extending support plate;

supporting at least one transfer station on said second elongated longitudinally extending support plate;

providing support means comprising at least two opposite sidewalls, two opposite end walls and a bottom wall;

securing said support means to said second elongated longitudinally extending support plate such that said support means projects in a direction toward said hollow elongated longitudinally extending base; and securing at least one of said opposite sidewalls of said support means to at least one of said at least two spaced apart support columns.

2. A modular support for supporting at least one necking-in station and at least one transfer station comprising;

a hollow elongated longitudinally extending base;

said hollow elongated longitudinally extending base having at least a top wall, a bottom wall, opposite sidewalls and opposite end walls;

a plate mounted on said top wall;

support structures projecting from and secured to said plate;

a first elongated longitudinally extending support plate having a longitudinal extent for supporting said at least one necking-in station;

said first elongated longitudinally extending support plate being supported on and secured to said support structures;

a second elongated longitudinally extending support plate for supporting said at least one transfer station; and additional support structures having at least a portion thereof secured to at least a portion of said support structures for supporting said second elongated longitudinally extending support plate.

3. The modular support as in claim 2 wherein:

said second elongated longitudinally extending support plate having a longitudinal extent substantially less than the longitudinal extent of said first elongated longitudinally extending support plate;

said additional support structures comprising at least two opposite sidewalls and two opposite end walls secured to and projecting from said second elongated longitudinally extending support plate in a direction toward said hollow elongated longitudinally extending base; and at least one of said opposite sidewalls being secured to said at least a portion of said support structures.

4. The modular support as in claim 3 wherein said support structures comprise:

two spaced apart support structures and;

each of said two spaced apart support structures having at least a first pair of opposite sidewalls and at least a second pair of opposite sidewalls.

5. Modular supports for supporting a plurality of necking-in stations and a plurality of transfer stations comprising:

a plurality of modular supports in a side-by-side relationship;

each of said plurality of modular supports comprising:

a hollow elongated longitudinally extending base;

said hollow elongated longitudinally extending base having at least a top wall, a bottom wall, opposite sidewalls and opposite end walls;

a plate mounted on said top wall;

support structures projecting from and secured to said plate;

a first elongated longitudinally extending support plate having a longitudinal extent and being supported on and secured to said support structures for supporting at least one of said plurality of necking-in stations;

a second elongated longitudinally extending support plate for supporting at least one of said plurality of transfer stations; and additional support structures having at least a portion thereof secured to at least a portion of said support structures for supporting said second elongated longitudinally extending support plate.

6. The modular supports as in claim 5 and further comprising:

releasable securing apparatus for securing together at least a portion of said additional support structures to said at least a portion of said support structures; and additional releasable securing apparatus for releasably securing together said hollow elongated longitudinally extending bases of adjacent ones of said plurality of modular supports.

7. The modular support as in claim 6 wherein:

said second elongated longitudinally extending support plate having a longitudinal extent substantially less than the longitudinal extent of said first elongated longitudinally extending support plate;

said additional support structures comprising at least two opposite sidewalls and two opposite end walls secured to and projecting from said second elongated longitudinally extending support plate in a direction toward said hollow elongated longitudinally extending base; and at least one of said opposite sidewalls being secured to said at least a portion of said support structures.

8. The modular support as in claim 7 wherein said support structures comprise:

two spaced apart support structures; and each of said two spaced apart support structures having at least a first pair of opposite sidewalls and at least a second pair of opposite sidewalls.

9. The modular supports as in claim 8 and further comprising:

a deflection plate extending between and secured to each of said at least two spaced apart support structures.

10. The modular supports as in claim 8 and further comprising:

at least two vibration absorbing pads secured to said hollow elongated longitudinally extending bases in spaced apart relationship along the longitudinally extending center line thereof.

11. The modular supports as in claim 8 wherein said releasable securing means comprises:

flange portions on each of said opposite sidewalls of said additional support structures projecting past said opposite end walls and having spaced apart openings formed therein;

said at least two spaced apart support structures having a plurality of spaced apart threaded openings formed therein; and a headed threaded bolt passing through each of said openings in said flange portions and threadedly secured in one of said threaded openings.

12. The modular supports as in claim 11 wherein said additional releasable securing means comprise;

each of said opposite end walls of said base having a C-shaped transverse cross-sectional configuration with the open portion facing outwardly;

each of said opposite end walls of said base having opposite end portions;

each of said opposite sidewalls of said base secured to said opposite end portions;

each of said opposite sidewalls of said base having spaced apart openings formed therein and located in said C-shaped portion of said opposite end walls of said base; and fastening means passing through said openings in adjacent sidewalls to secure adjacent bases together.

13. Modular supports for supporting a plurality of necking stations and at least one transfer station comprising:

at least a first modular support and a second modular support in a side-by-side relationship;

each of said at least a first modular support and a second modular support comprising:

a base portion;

a plurality of support columns projecting from and secured to said base portion;

at least one necking station supported by said plurality of support columns;

wherein the base portion of said first modular support is secured to the base portion of said second modular support.

14. The modular supports as in claim 13, wherein:

the base portion of said first modular support is releaseably secured to the base portion of said second modular support.

15. The modular supports as in claim 13, wherein:

each of said at least a first modular support and a secon modular support comprises two support columns.

16. The modular supports as in claim 15, wherein:

said support columns are spaced from one another.

17. The modular supports as in claim 13, wherein:

said base portion is hollow and has at least a top wall opposite sidewalls and opposite end walls.

18. The modular supports as in claim 13 wherein:

said base portion extends in a generally horizontal direction.

19. The modular supports as in claim 13 wherein:

said base portion has a generally rectangular cross sectional configuration.

20. The modular supports as in claim 13 wherein:

at least one of said plurality of support columns has a least a first pair of opposite sidewalls and at least a second pair of opposite sidewalls.

21. The modular supports as in claim 13 and further comprising:

a plurality of vibration absorbing supports secured to said base portion.

22. Modular supports for supporting a plurality of necking stations comprising:

at least a first modular support and a second modular support in a side-by-side relationship;

each of said at least a first modular support and a second modular support comprising:

a substantially hollow base portion;

at least one support column projecting upwardly from said base portion; and at least one necking station supported by said at least one support column; and wherein said first modular support is secured to said second modular support.

23. The modular supports as in claim 22, wherein;

the base portion of said first modular support is secured to the base portion of said second modular support.

24. The modular supports as in claim 22, wherein:

the base portion of said first modular support is releaseably secured to the base portion of said second modular support.

25. The modular supports as in claim 22, wherein:

each of said at least a first modular support and a second modular support comprises two support columns.

26. The modular supports as in claim 25, wherein:

said support columns are spaced from one another.

27. The modular supports as in claim 22, wherein:

said base portion has at least a top wall, opposite sidewalls and opposite end walls.

28. The modular supports as in claim 22 wherein:

said base portion extends in a generally horizontal direction.

29. The modular supports as in claim 22 wherein:

said base portion has a generally rectangular cross-sectional configuration.

30. The modular supports as in claim 22 wherein:

said at least one support column has at least a first pair of opposite sidewalls and at least a second pair of opposite sidewalls.

31. The modular supports as in claim 22 and further comprising:

a plurality of vibration absorbing supports secured to said base portion.

* * * * *

UNITED STATES PATENT AND TRADEMARK OFFICE
CERTIFICATE OF CORRECTION

PATENT NO : 5,785,294

DATED : July 28, 1998

INVENTOR(S) : Robert H. Schultz

It is certified that error appears in the above-identified patent and that said Letters Patent is hereby corrected as shown below:

IN THE CLAIMS

Column 3, Line 60: ";" should read --:--

Column 5, Line 36: ";" should read --:--

Signed and Sealed this

Sixteenth Day of March, 1999

Attest:

Q. TODD DICKINSON

Attesting Officer     *Acting Commissioner of Patents and Trademarks*